United States Patent [19]

Roll et al.

[11] Patent Number: 5,386,366
[45] Date of Patent: Jan. 31, 1995

[54] METHOD OF REGULATING THE BRAKING FORCE OF MOTORCYCLES

[75] Inventors: Georg Roll, Heusenstamm; Heinz F. Ohm, Weiterstadt; Berthold Hauser, Jakobsneuharting, all of Germany

[73] Assignees: S:FAG Kugelfischer Georg Schafer KGaA; Bayerische Motoren Werke AG, both of Germany

[21] Appl. No.: 2,894

[22] Filed: Jan. 11, 1993

Related U.S. Application Data

[63] Continuation-in-part of Ser. No. 962,890, Oct. 19, 1992, Pat. No. 5,324,102.

[30] Foreign Application Priority Data

Jan. 10, 1992 [DE] Germany .................. 4200440

[51] Int. Cl.⁶ .................. B60T 8/32; B60K 31/00
[52] U.S. Cl. .................. 364/426.01; 364/426.02; 303/9.64; 303/100
[58] Field of Search .................. 364/426.01, 426.02, 364/426.03; 303/9.64, 92, 93, 97, 104, 109, 113.5, 113.2, 115.6; 180/197, 170, 218; 188/181 A; 280/276, 267, 735

[56] References Cited

U.S. PATENT DOCUMENTS

| | | | |
|---|---|---|---|
| 4,435,768 | 3/1984 | Arikawa | 364/426 |
| 4,494,800 | 1/1985 | Hayashi | 303/6 A |
| 4,511,156 | 4/1985 | Offenstadt | 280/276 |
| 4,626,042 | 12/1986 | Burckhardt | 303/106 |
| 4,834,221 | 5/1989 | Yoshinori et al. | 188/181 A |
| 5,005,916 | 4/1991 | Fujioka et al. | 303/103 |
| 5,072,393 | 12/1991 | Mori et al. | 364/426.02 |
| 5,150,298 | 9/1992 | Fujioka et al. | 364/426.02 |
| 5,156,231 | 10/1992 | Trema | 180/227 |
| 5,241,478 | 8/1993 | Inoue et al. | 364/426.02 |
| 5,257,856 | 11/1993 | Ota et al. | 303/100 |

*Primary Examiner*—Kevin J. Teska
*Assistant Examiner*—Tan Nguyen
*Attorney, Agent, or Firm*—Ostrolenk, Faber, Gerb & Soffen

[57] ABSTRACT

A method for controlling the braking force of motorcycles, which includes storing the vehicle deceleration value which was measured when a lift-off signal occurred as an optimal deceleration limit value and reducing the braking force applied to the front brakes if the motorcycle deceleration approaches or exceeds this limit. A lift-off signal is generated if after a predetermined time from the initiation of a braking cycle, it is determined that the rear wheel has lost adherence to the grounds.

5 Claims, 6 Drawing Sheets

METHOD OF REGULATING THE BRAKING FORCE OF MOTORCYCLES

CROSS REFERENCE TO RELATED APPLICATIONS

This application is a continuation-in-part of U.S. Ser. No. 07/962,890, filed Oct. 19, 1992 and entitled Method and Apparatus for Regulating the Braking Force of Motorcycles, now U.S. Pat. No. 5,324,102. The entire disclosure of the parent application is incorporated by reference herein.

BACKGROUND OF THE INVENTION

The present invention relates to a method of regulating the braking force of motorcycles.

Applicant's parent application describes one such method by which the tipping of motor vehicles which are threatened by lift-off (particularly motorcycles) in the event of fast deceleration is recognized and counteracted.

In this connection, the front-wheel brake pressure is always reduced in accordance with a predetermined time function when a lift-off process has been recognized on basis of a given, continuously checked wheel-speed pattern. When the corresponding speed pattern no longer indicates lift-off, the front wheel brake pressure is built up again in accordance with a substantially preestablished reloading function, this function being so selected that, on the one hand, the average brake pressure over the period of reloading is as great as possible and, on the other hand, lift-off or a collapse in front wheel speed due to overbraking does not take place immediately.

Under unfavorable conditions, this control mechanism can have the result that a case of lift-off is brought about cyclically again and again by system-caused buildup of pressure. The strong pressure modulations which take place in this connection lead to poor control comfort, particularly in the lower speed range. Furthermore, the large pressure gradients in negative and positive direction cause a see-sawing behavior of the vehicle, as a result of which the center of gravity of the vehicle is shifted phase-wise far forward and upward, which leads to renewed lift-off situations even if the deceleration of the vehicle is still far from the maximum.

In order to avoid these self-excited cases of lift-off it is desirable to keep the vehicle quiet, in particular in the lower speed range, and to bring it very cautiously to the optimal deceleration point. However, this is possible only if cyclic lift-off is in general avoided.

SUMMARY OF THE INVENTION

The object of the present invention is therefore to provide a method of regulating the braking force of motorcycles which avoids the above-mentioned disadvantages and, by simple means, permits comfortable braking behavior upon high deceleration of the vehicle.

This object is achieved in accordance with the present invention by an additionally acting control mechanism which operates on the basis of a previously recognized lift-off situation and is able to avoid further cases of lift-off during this braking with a high degree of certainty.

Since this control mechanism leads to the quieting of the vehicle, not only the braking comfort but also the vehicle deceleration are increased since strong pressure modulations which, averaged over time, practically always result in poor deceleration values, are no longer required.

The control mechanisms developed can be considered a supplement to a standard ABS controller. Upon integration in such a system, different signals which the ABS controller in any event works out can be simultaneously utilized.

The invention will be explained with reference to an embodiment.

Other features and advantages of the present invention will become apparent from the following description of the invention which refers to the accompanying drawings.

DETAILED DESCRIPTION OF THE INVENTION

Figure 1:
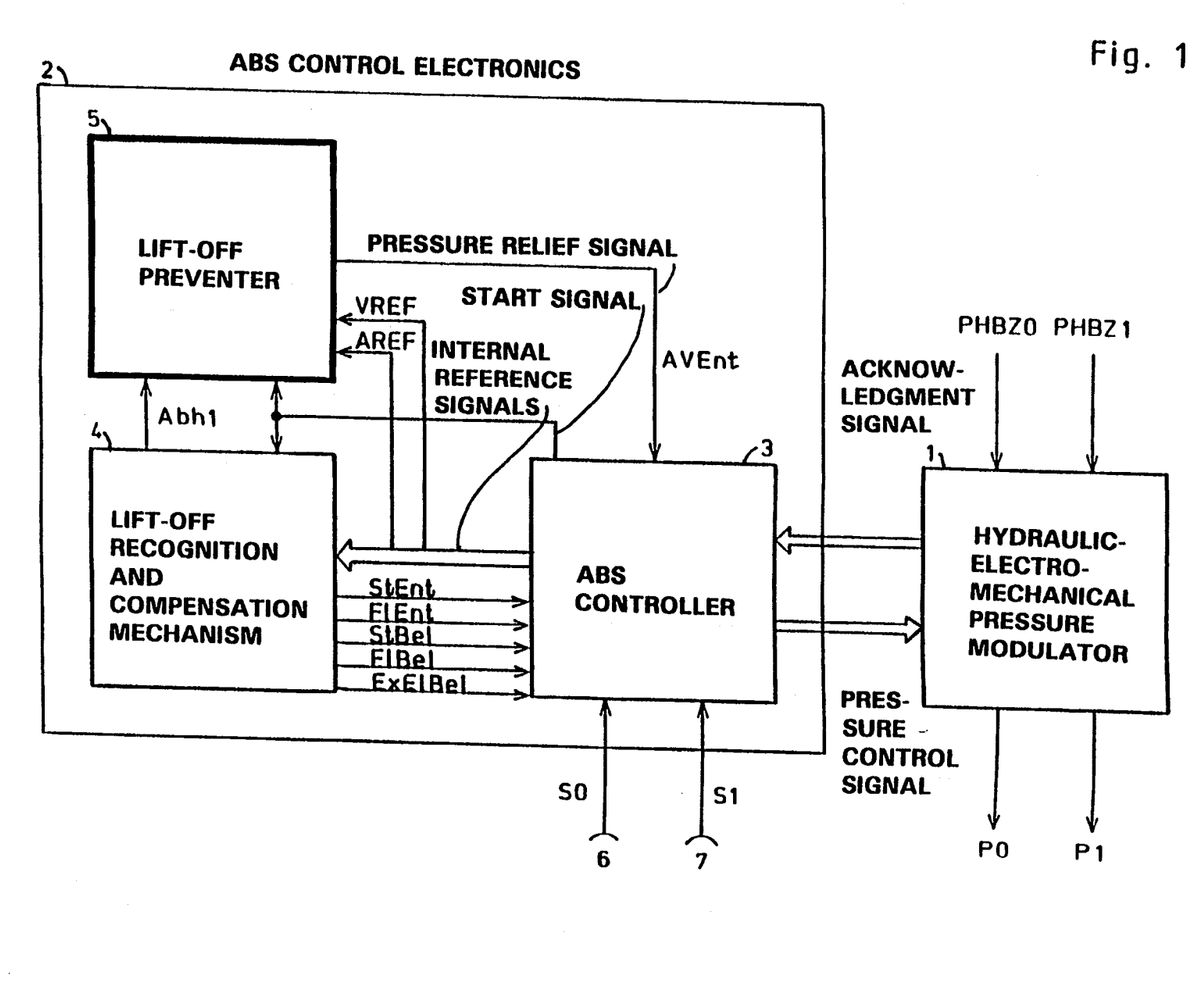
FIG. 1 is a block diagram of an anti-lock system with lift-off recognition and compensation mechanism as well as additional lift-off preventer.

FIG. 1 shows a block diagram of an anti-lock system consisting of a hydraulic-electro-mechanical pressure modulator 1 and an electronic control unit 2 which, in addition to the components for the ABS controller 3, also contains a lift-off recognition and compensation mechanism 4 as well as the lift-off preventer 5 of the invention. These function blocks 3, 4, 5 can be produced both by special hardware and by software implementation.

In order to describe the inclusion of the lift-off preventer in a normal anti-lock system, the functional relationships of blocks 1, 3, 4 and 5 will be briefly described below. The ABS controller 3 receives trains of pulses S0 and S1 from the inductive wheel sensors 6, 7 and from the frequencies of said trains of pulses it directly calculates the actual circumferential speeds V0 and V1 of the two wheels of the motorcycle. From V0 and V1 the ABS controller determines further internal reference signals, such as, for instance, the vehicle reference speed VREF and the vehicle reference deceleration AREF, so that it can recognize overbraking conditions and reliably compensate for them. In case of the occurrence thereof, and thus upon the danger of locking, the ABS controller 3 gives off pressure-control signals to the pressure modulator 1 so that the latter reduces the main brake cylinder pressures PHBZ0 and PHBZ1 determined by the driver and forwards them, as wheel brake-cylinder pressures P0 and P1. to the two wheel brake circuits. The pressure modulator taken as basis here gives acknowledgment signals to the ABS controller; this is information with regard to the brake pressures P0 and P1 set and therefore, in the case of a plunger pressure modulator (see German OS 35 30 280), the pressure-determining positions of the plungers.

The internal reference signals can now also be used by additional components of the control electronics 4, 5. The lift-off recognition and compensation mechanism 4 on basis of these signals recognizes whether a case of lift-off is present and advises the ABS controller in the different phases of the compensation on basis of the control signals StEnt, FlEnt, StBel, FlBel and ExFlBel, what pressure modulation is necessary in each case. The ABS controller generates the modulator-specific pressure control signals from this.

ABS controller 3 and lift-off mechanism 4 therefore operate in parallel: When an overbraking situation occurs, the ABS controller assumes control and regulates the brake pressures by corresponding control of the pressure modulator. In the event that a lift-off of the vehicle is recognized, the control passes to the lift-off mechanism, which uses the ABS controller as interface in order to control the pressure modulator. In this way, the lift-off mechanism is developed at minimal expense.

The same is true of the lift-off preventer 5, which can be considered another component acting in parallel to the ABS controller and lift-off mechanism.

The lift-off preventer 5 also utilizes in part the internal reference signals prepared by the ABS controller (in this case, particularly VREF and AREF) as well as a start signal which indicates to the lift-off preventer 5 the start of a ABS control braking for data initialization.

In addition, the lift-off preventer 5 receives from the lift-off mechanism 4 a signal Abhl which indicates that a severe case of lift-off is present.

In order also to be able to influence the pressure modulation, the lift-off preventer 5 conducts the signal AVEnt to the ABS controller 3 and causes the latter to effect a reduction in pressure by a fixed amount if AVEnt is logical "1".

Manner of Operation of the Lift-Off Preventer Explanation of the Variables and Constants S0 Signal from the inductive front-wheel sensor which permits a determination of the actual front-wheel circumferential speed.

S1 Signal from the inductive rear-wheel sensor which permits a determination of the actual rear-wheel circumferential speed.

V0 Front-wheel instantaneous speed (an ABS controller forms the instantaneous wheel circumferential speed from the wheel-sensor signals in each control cycle).

V1 Rear-wheel instantaneous speed.

P0 Wheel brake-cylinder pressure on the front wheel (this pressure is set upon the control braking by the ABS controller; the mechanisms shown here can indirectly affect P0 via the ABS controller).

P0_i P0 at time i.

P1 Wheel brake-cylinder pressure on the rear wheel.

PHBZ0 Main brake-cylinder pressure of the front-wheel channel.

PHBZ1 Main brake-cylinder pressure of the rear-wheel channel.

VREF Calculated vehicle reference speed (is formed from filtered wheel speeds and plausibility consideration).

AREF Filtered vehicle deceleration (derivative with respect to time of VREF which, due to the short control-cycle times varies, to be sure, very greatly. For this reason, a filtering of this signal is generally effected. AREF is assumed as such a filtered vehicle deceleration.)

AREF_i AREF at the time i.

AREF_old AREF value from the previous control cycle (AREF_old is prepared for formation of the increase in vehicle deceleration DAREF from AREF over a control cycle).

DAREF AREF_old_AREF. (Increase in vehicle deceleration from one control cycle to the next.)

AREFGrz AREF at the time of the definite recognition of a lift-off situation (this signal is formed by the storing of AREF by the mechanisms described here).

AREFGrz_Min Minimal value of AREFGrz which is still accepted as sufficiently large lift-off deceleration time.

DAREFMax Maximum permissible increase in vehicle deceleration (is formed by the lift-off preventer in accordance with a function from AREF and AREFGrz; if DAREF exceeds the value of DAREFMax, the ABS controller is caused to reduce the brake pressure on the front-wheel channel by a slight amount).

Abhl If a case of serious lift-off is present (Boolean 1-bit signal which sets the lift-off recognition mechanism at logical "1" as long as a case of lift-off is present).

Start signal Start pulse for the ABS control (Boolean 1-bit signal which is set to logical "1" only in the first cycle of each ABS control and in all other cycles lies at logical "0".

Control cycle pulse Timing signal which is switched with the period of an ABS control cycle (here 8 ms) > 125 Hz AVEEnt Relief signal from the lift-off preventer (Boolean 1-bit signal which sets the lift-off preventer at logical "1" when a new lift-off situation commences during a control braking; the ABS controller reacts to this by a relief of pressure by a fixed amount on the front wheel).

StEnt Control signal on the ABS controller; effects a steep relief in pressure on the front wheel.

FlEnt Control signal on the ABS controller; effects a flat relief in pressure on the front wheel.

StBel Control signal on the ABS controller; effect a steep reloading of pressure on the front wheel.

FlBel Control signal on the ABS controller; effects a flat reloading of pressure on the front wheel.

ExFlBel Control signal on the ABS controller; effects an extremely flat reloading of pressure on the front wheel.

Tab Time at which a lift-off is recognized.

Tab_i Time at which a lift-off is recognized for the i-th time within a control braking.

Tein Time at which a collapse of wheel speed caused by overbraking is recognized.

Taus Time at which a lift-off or a reduction in wheel speed has been compensated for.

Taus_i Time at which, within a control braking, lift-off or a collapse in wheel speed has been compensated for the i-th time.

K1,K2 Constants for the calculation of the function: DAREFMax=f (AREF, AREFGrz, VREF)

1g Acceleration due to gravity=9.81 m/s$^2$

If a case of lift-off has taken place already during an ABS braking, the lift-off preventer notes the corresponding vehicle reference deceleration AREF which was calculated at the time of the definite recognition of the lift-off. In order not erroneously to note too low a point it is required that the deceleration noted must exceed a minimum limit value of, for instance, 0.7 g.

This value can be established in a manner specific to the vehicle and be shifted correspondingly upward for vehicles which are less endangered by lift-off.

After the compensating of the lift-off, the deceleration drops among other things to a value which is about 0.2 to 0.3 g below the lift-off deceleration. In the case of steep buildup again of the optimal pressure point, the deceleration of the vehicle increases greatly over time.

By too strong a deceleration gradient, the front axle fork of the vehicle is subjected to spring action with high dynamics, as a result of which a strong tipping moment around the axis of the front wheel occurs at least for a short time.

Figure 2:
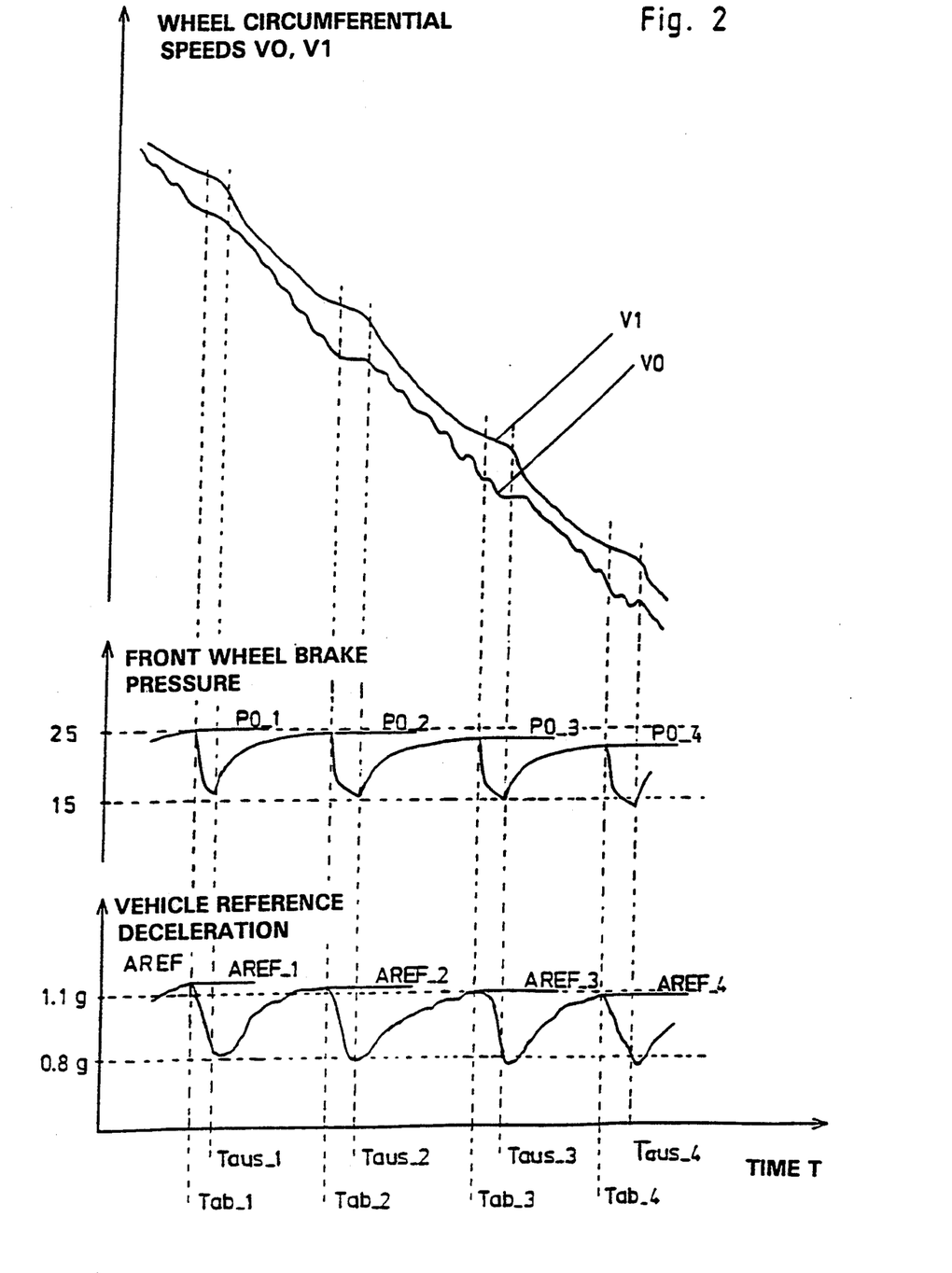
FIG. 2 is a time graph of a control braking with lift-off compensation in accordance with the parent application.

As can be noted from FIG. 2, this process can have the result that the vehicle shows lift-off tendencies already before the maximum possible deceleration value is even merely approximately reached:

$$P0\_4 < P0\_3 < P0\_2 < P0\_1$$
$$AREF\_4 < AREF\_3 < AREF\_2 < AREF\_1$$

Due to the instability of the vehicle, the front-wheel brake pressure P0 and the calculated vehicle reference deceleration AREF therefore decrease continuously in the course of a braking.

Of course, the real vehicle deceleration also decreases so that, in addition to the unpleasant tipping phenomena, there is also a slight overall underbraking.

In practice, it has been found that too strong an increase of AREF very rapidly leads to lift-off and therefore is already directly evaluated as indication of a threatening lift-off.

Figure 3:
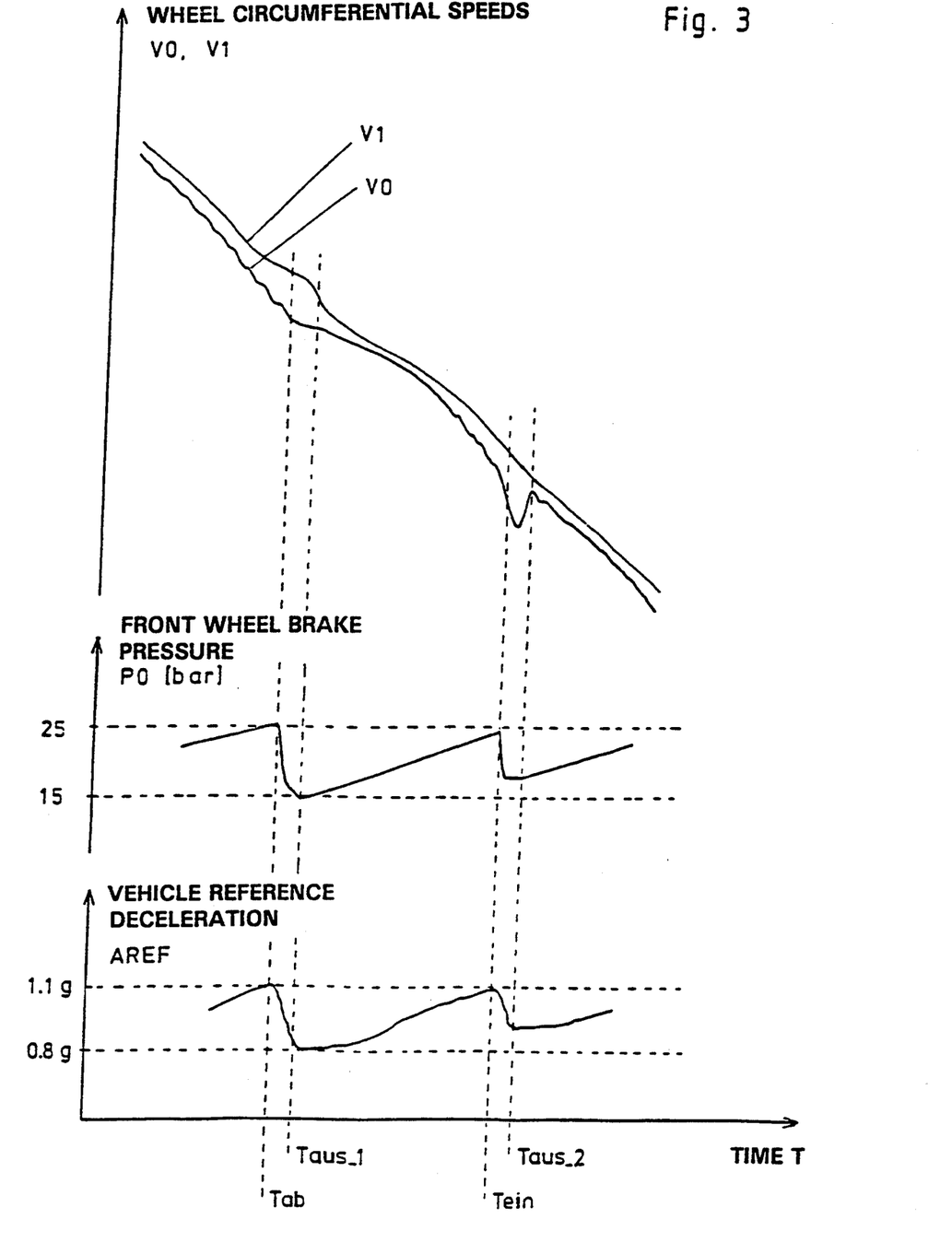
FIG. 3 is a time graph of a control braking with slow pressure build-up.

FIG. 3 shows a possibility of suppressing further cases of lift-off during a control braking by a generally slower build-up of pressure.

This would, to be sure, lead to clear conditions of underbraking since the previous pressure reduction for the compensating for such a true case of lift-off may have been very great. Therefore, a pressure build-up such as in FIG. 2 should already take place in order once again to be at the optimal point as rapidly as possible.

However, in the event of such a pressure buildup to be able to prevent another lift-off already before it starts, the increase in the deceleration of the vehicle must be continuously monitored. If too large a gradient occurs, the pressure must be stopped or even reduced for a short time until the gradient again assumes a sufficiently small value. By the small gradient in the deceleration of the vehicle the result is obtained that the vehicle is pressed very slowly into the front wheel axle spring without a hectic tipping taking place.

In the case of slow build-up of the deceleration, the center of gravity remains quiet and low and the vehicle handles enormous deceleration values. This quiet position has a positive effect also on the actual ABS braking since the front wheel tire can properly "mesh" with the ground, while in the case of a hectic pressure buildup and tipping of the vehicle, the wheel contact force varies so greatly that even a premature tendency to wheel locking can occur, which is still by far not present in the "quasi-static" case of the quiet position.

In order now to be certain that no underbraking occurs due to the quiet position, the gradient-caused reduction in pressure is only effected when the deceleration has already assumed values in the region of the previously noted lift-off deceleration point so that another lift-off must now be expected.

Thus a full braking of a vehicle endangered by a lift-off on ground of good adherence takes place inter alia in the following manner:

First of all, a lift-off is recognized and compensated for by the mechanism 5 described in the parent application. The value of the vehicle reference deceleration AREF calculated at the time of lift-off is stored as lift-off deceleration value AREFGrz specific to the vehicle loading, which value, as a matter of precaution, must not to be less than a fixed, predetermined minimum value AREFGrz_Min which is specific to the vehicle.

In the further course of the entire braking, the stored value AREFGrz serves as good deceleration value for the existing state of the vehicle and the nature of the ground, which value, to be sure, may still be exceeded, in which connection, however, such exceeding must take place only with low dynamics so that the vehicle remains quiet.

With too strong an increase in the deceleration in the region of AREFGrz, the brake pressure on the front wheel channel is slightly reduced, so that the increase in deceleration takes place slowly.

In order to arrive as rapidly as possible at the optimal pressure point without danger of lift-off, the permissible deceleration gradient DAREFMax is formulated as a function of the deceleration already reached.

Figure 4:
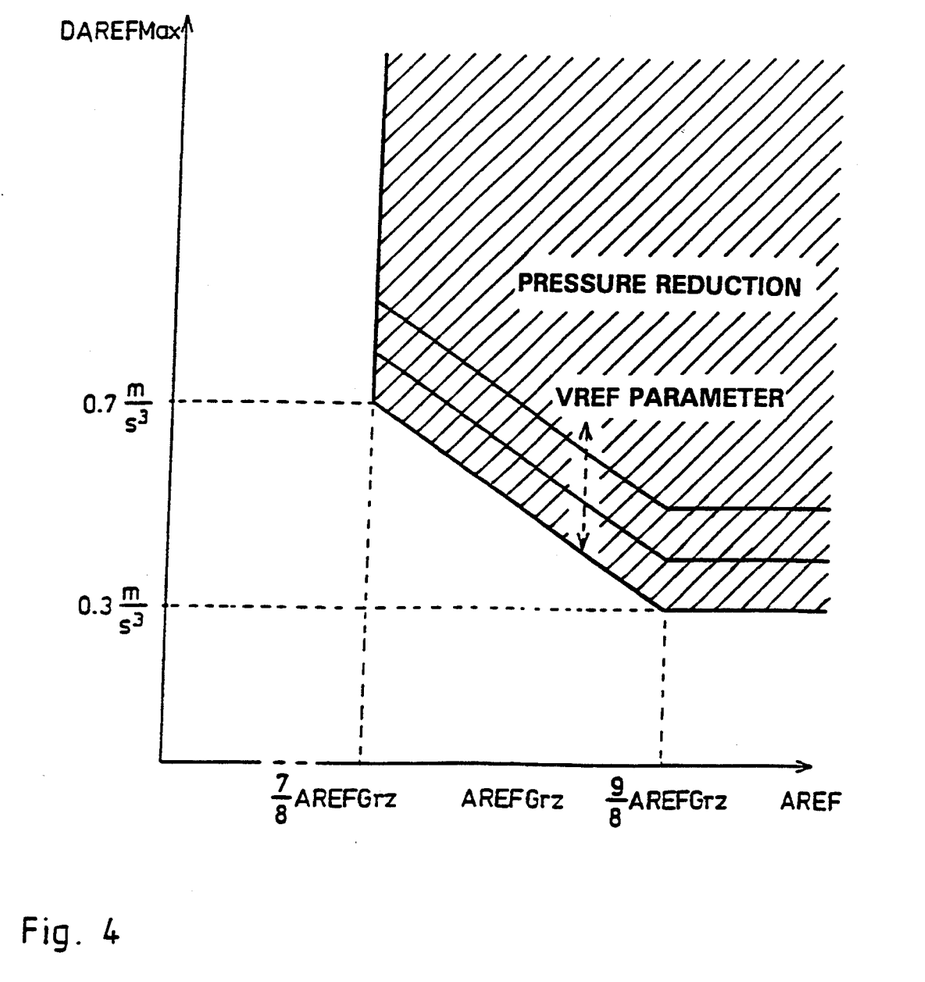
FIG. 4 is a function for the maximum permissible increase in deceleration.

FIG. 4 shows the function which states that any gradients DAREFMax are permitted as along as AREF is still below ⅞ AREFGrz and a linear decrease of DAREFMax from 0.7 m/s³ to 0.3 takes place between ⅞ AREFGrz and 9/8 AREFGrz. For AREF > 9/8 AREFGrz, the minimal value 0.3 m/s³ is maintained.

DAREFMax = infinite for AREF < 7/8 AREFGrz
DAREFMax = 0.7 m/s³ − K1 * (AREF − 7/8 AREFGrz)
for
7/8 AREFGrz < 9/8 AREFGrz
DAMFMax = 0.3 m/s³ for AREF > 9/8 AREFGrz In addition, the pressure reduction function can also be calculated as a function of the vehicle speed VREF reached, since, with high speeds as a result of the large air resistance, less tendency to lift-off is, in principle, to be noted than in the case of low speeds.

FIG. 4 shows a possibility of using VREF as parameter for a family of functions. For example, a VREF-dependent term can be superimposed additively on the base function:

DAREFMax = infinite for AREF < 7/8
AREFGrz   DAREFMax = 0.7 m/s³ − K1 * (AREF < 7/8
AREFGrz) + K2
* VREF
for 7/8 AREFGrz < AREF < 9/8
AREFGrz
DAREFMax = 0.3 m/s³ + K2 * VREF for AREF > 9/8
AREFGrz Development of the Lift-Off Preventer In order that the control mechanism of the invention can operate effectively, relatively accurate information as to the actual vehicle deceleration at the time is required.

This could be obtained, for instance, by an acceleration transmitter, which would then be provided, in addition, as hardware equipment.

As shown by practical investigations, a vehicle reference deceleration AREF determined by calculation is, however, also sufficient. The obtaining of AREF is possible by derivation of the calculated vehicle reference speed VREF, in which connection a filtering should also still be effected since, due to the short scanning times (the control cycle time is, for instance, 8 ms), strong variations in deceleration by jitter can occur in VREF.

VREF, in its turn, is determined from the only really measurable variables, the wheel circumferential speeds V0 and V1, also by filtration and extrapolation.

The obtaining of VREF and AREF represents a standard problem for every good ABS controller in order to avoid conditions of underbraking during a control braking. It should merely be pointed out here that the determination of VREF in the case of vehicles endangered by lift-off must depend strongly on the circumferential speed of the front wheel so that the uncertain speed of the rear wheel does not lead to reference falsifications which would make the recognition of conditions of lift-off impossible.

Upon the filtering for the determination of VREF and AREF, it is in general to be seen to it that the variables do not reflect every brief change in the wheel speeds but, on the other hand, express, as free of distortion as possible, clear tendencies upon a change in the deceleration of the vehicle.

Figure 5:
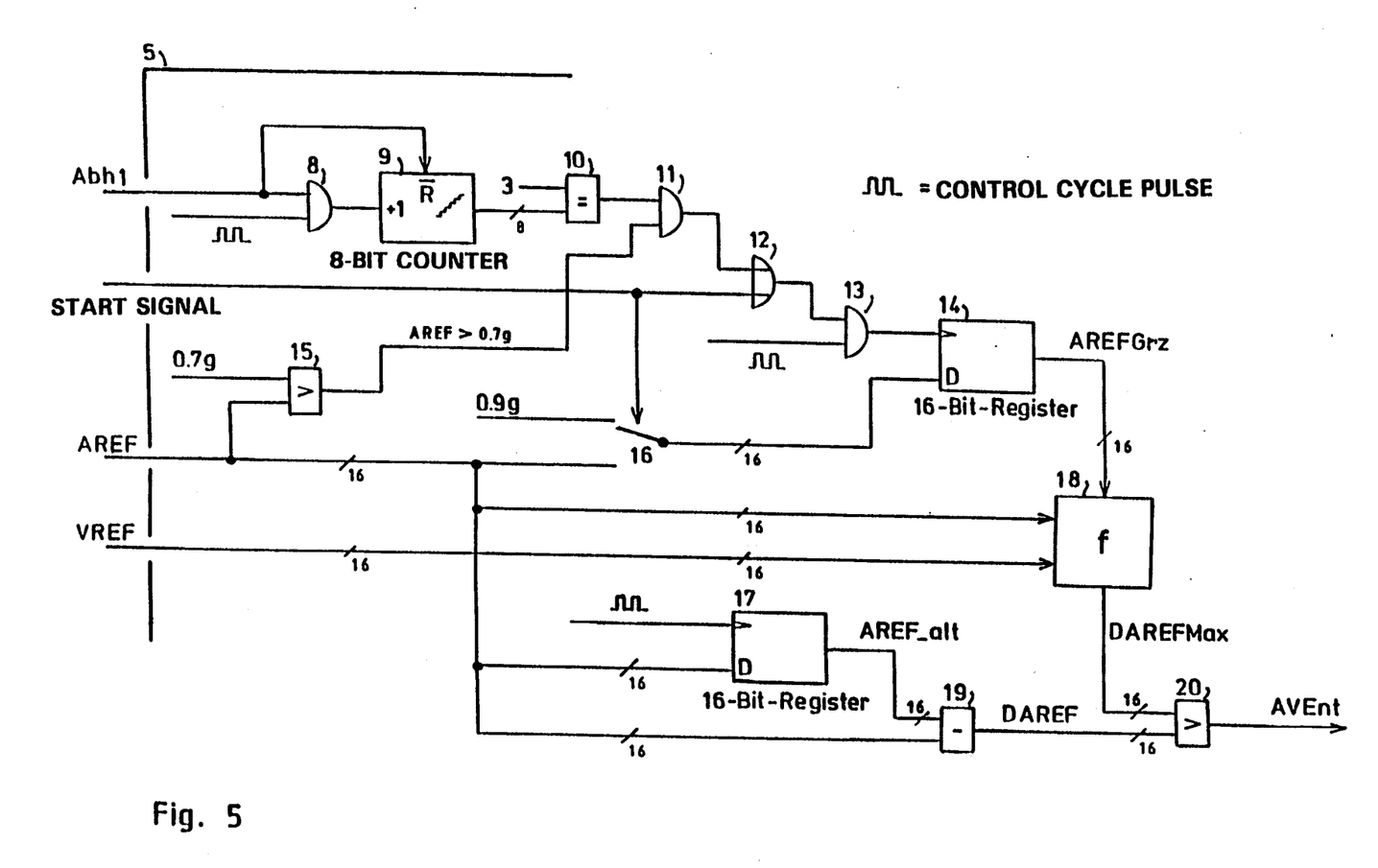
FIG. 5 shows a block diagram of an embodiment of the circuit of the lift-off preventer.

FIG. 5 shows an embodiment of the lift-off preventer. A start value of 0.9 g for AREFGrz is stored in the 16-bit register 14 via a 16-bit multiplexer 16 outside the ABS control. This is done by means of the control signal "start signal", which becomes "1" precisely upon entrance into the control for a control cycle and thus places the constant value 0.9 g on the data inputs of the register 14. At the same time, "start signal" switches the OR gate 12 and thus opens the gate circuit (AND gate) 13 so that the control cycle pulse produces a timing pulse at the pulse input of the register 14, so that the start value 0.9 g is taken over into the register. This start value therefor applies for the beginning of each new ABS braking as initial value of AREFGrz since at that time no real lift-off deceleration is present as yet. The values of previous brakings are intentionally not noted, since the condition of loading of the vehicle and the conditions of the road may have changed greatly since the last ABS braking. It is assumed that these conditions remain substantially constant only within one braking.

Thus, at the start of the ABS control there is present a start value for AREFGrz which can be selected specific for the vehicle and results from certain average empirical values. For a vehicle which, under ordinary conditions of load, already tends to lift-off upon smaller decelerations, the start value for AREFGrz is selected correspondingly smaller.

If, now, a case of lift-off occurs during the control, then the lift-off recognition mechanism in accordance with the parent application supplies a signal Abhl which controls an 8-bit counter 9 via the AND gate 8.

With each control cycle pulse the counter is incremented by 1 when Abhl supplies a logical "1". If Abhl is "0", the counter is immediately reset to the value 0.

If the lift-off mechanism recognizes lift-off in three successive control cycles, and the signal Abhl is therefore at "1" for three cycles, then the counter 9 reaches a reading of 3. The comparator 10 then connects a logical "1" to its output.

If, at the same time, the vehicle reference deceleration AREF exceeds the threshold value 0.7 g (AREFGrz_Min), then the comparator 15 also delivers a logical "1" so that the AND gate 11 and the OR gate 12 switch. The next control cycle pulse then produces a timing pulse on the 16-bit register 14 so that the actual value of AREF is deposited as new vehicle deceleration value AREFGrz at which the vehicle actually tends to lift off.

Thus, the originally assumed start value of AREFGrz is now corrected in accordance with the conditions which are actually present. This value is now relevant as reference value until a new lift-off takes place within the ABS braking despite the attempt at preventing lift-off. At the latest upon the next ABS control, the constant start path (here 0.9 g) is again loaded as AREFGrz. The value of AREFGrz is, of course, also lost upon disconnection of the ignition of the vehicle.

As a function of the actual vehicle reference deceleration AREF, of the lift-off value AREFGrz, and of the actual vehicle reference speed VREF, the function generator 18, continuously determines an increase in the vehicle reference deceleration DAREFMax which is just still permissible in accordance with the function described above (see FIG. 4).

The increase in the vehicle reference deceleration DAREF actually present is calculated by the subtractor 19 from the actual deceleration value AREF and the deceleration value AREF_old of the previous control cycle which has been stored by the 16-bit register 17.

A comparison between DAREF and the tolerable maximum value DAREFMax is effected by the 16-bit comparator 20.

If DAREF exceeds the value of DAREFMax, then the comparator 20 produces a logical "1" at its output and advises the ABS controller, by this control signal AVEnt that a reduction in pressure by a small (constant) amount must take place on the front wheel.

For DAREF<DAREFMax, the comparator 20 indicates by a logical "0" to the ABS controller that the normal pressure build-up can be continued.

The principle of the fine reduction in pressure and of the cautious build-up of pressure in the loading phase can be accomplished particularly well by ABS pressure modulators which operate in accordance with the plunger principle since the pressure-setting plunger can be positioned very precisely on desired paths (see, in this connection, German OS 35 30 280).

Figure 6:
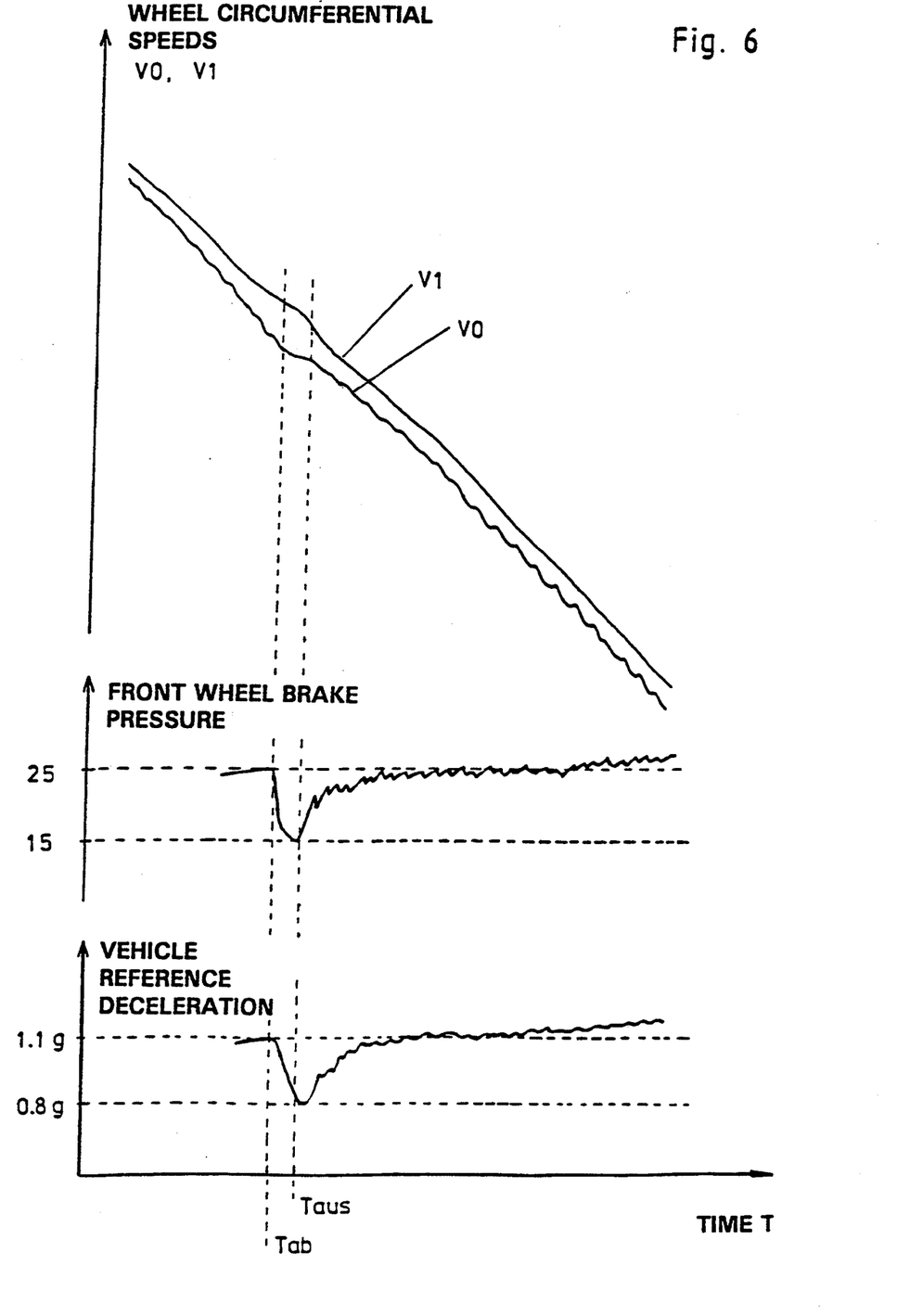
FIG. 6 is a time graph of a control braking with lift-off preventer.

The graph in FIG. 6 shows a typical control braking of a vehicle which is endangered by lift-off. The control is originally activated via wheel-locking tendencies. A case of lift-off then takes place which is counteracted by the mechanism described in the parent application. By the noting of the corresponding vehicle deceleration point and the gradient limitation of the deceleration described above, a further lift-off can be completely avoided here without a reduction in deceleration having to be tolerated.

The final deceleration value shortly before the stopping of the vehicle is substantially higher than the value reached previously upon the lift-off. The good utilization of the deceleration is therefore obtained in principle in the manner that after a recognized lift-off has been counteracted by the lift-off mechanism, a steep buildup of pressure is immediately effected (as described more fully in the parent application), which, however, can be interrupted for a short time by the lift-off preventer if it notes that the vehicle reference deceleration AREF is increasing dramatically. In this way, a good pressure point is rapidly reached without the front wheel tire being able to enter too early into too strong a force-lock with the ground (while the front wheel fork is still sprung out). Every time that too hectic a "meshing" of the tire with the group commences, which could lead to the tipping of the vehicle, the lift-off preventer detects the large increase in AREF and for a short time reduces the front-wheel pressure.

Due to the fact that the lift-off preventer becomes active only at the actually measured lift-off deceleration point, the system adjusts itself very flexibly to the actual condition of loading of the motorcycle. With a low position of the center of gravity, the increase in the deceleration of the vehicle may be large even if a high absolute deceleration is already present. With a high position of the center of gravity (pillion rider, etc.), the lift-off preventer is connected already at smaller decelerations of the vehicle and dampens the increase in deceleration at an early moment.

As shown in FIG. 6, at the end of the braking with a high AREF, a slight jittering takes place at the front wheel speed V0. This indicates that the wheel brake slippage is in the region of the slippage peak and can be held there for a long time by the careful nature of the pressure build-up.

The lift-off preventer thus also acts to support the ABS controller since an optimal course of the pressure is obtained also with respect to the avoidance of wheel locking processes. The lift-off preventer can therefore, particularly on grounds of good adherence see to it that wheel speed collapses are recognized already when they commence and are entirely suppressed, particularly in the lower speed range, which is of importance in particular when using sport tires having strongly pronounced $\mu$-slippage curve maxima.

One extension of the lift-off preventer consists then in the fact that not only the lift-off deceleration is noted as AREFGrz but, alternatively, also the vehicle reference deceleration AREF which has occurred upon a speed collapse of the front wheel.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method employing a microprocessor for regulating the braking force of a motorcycle having front and rear wheels with respective circumferential speeds and with respective front and rear brakes, which comprises the steps of:
   (a) sensing the circumferential speeds of the front and rear wheels;
   (b) initiating a braking cycle by applying a braking force to the front brake or the rear brake or both the front and rear brakes to decelerate the motorcycle;
   (c) determining from the circumferential speeds of the front and rear wheels the speed of the front wheel, the speed of the rear wheel and the deceleration of the motorcycle;
   (d) determining from the speeds of the front and rear wheels whether the rear wheel has lost adherence with the ground;
   (e) generating a control signal if, after a predetermined time from initiation of step (b), the rear wheel has lost adherence to the ground;
   (f) if the control signal is generated, storing the motorcycle deceleration at the time the control signal is generated as an optimal deceleration limit value;
   (g) repeating at least steps (b), (c), (d) and (e);
   (h) determining any increase in motorcycle deceleration from a value thereof previously determined step (c); and
   (i) reducing the braking force applied to the front if during a subsequent braking cycle the control signal is generated or the motorcycle deceleration approaches or exceeds the stored optimal deceleration limit and the increase in motorcycle deceleration exceeds a predetermined maximum valve thereof.

2. A method according to claim 1, wherein the rear wheel is determined to have lost adherence to the ground if either of the following conditions occur:
   (i) the deceleration of the motorcycle exceeds a predetermined maximum amount, and the speed of the rear wheel is greater by a minimum amount than the speed of the front wheel and, with no braking force applied to the brakes of the rear wheel, the deceleration of the rear wheel is less than a minimum amount; or
   (ii) the deceleration of the motorcycle exceeds a maximum amount and, with a braking force applied to the rear brakes, the slip of the rear wheel has exceeded the predetermined limit thereof after a predetermined amount of time after initiation of step (e); or or
   (iii) the deceleration of the motorcycle exceeds a maximum amount, and the slip of the rear wheel after application of a braking force thereto has exceeded the predetermined limit thereof and then returned to an acceptable value and thereafter the rear wheel has not accelerated to a predetermined value.

3. A method according to claim 1, wherein the predetermined maximum value of motorcycle acceleration is a function of the motorcycle deceleration, the motorcycle reference speed and the optimal deceleration limit.

4. A method according to claim 1, wherein if the value of motorcycle deceleration at the time of the control signal is generated is greater than a predetermined minimum value thereof, this greater value is stored is as the optimal deceleration limit value.

5. A method according to claim 1, wherein a tendency of the front week to lock is determined and the vehicle deceleration at the time of such tendency to lock is employed as the optimal deceleration limit value instead of the motorcycle deceleration at the time the control signal is generated.

* * * * *